(12) United States Patent
Rijsman (10) Patent No.: US 8,121,134 B2
(45) Date of Patent: *Feb. 21, 2012

(54) SPOOF CHECKING WITHIN A LABEL SWITCHING COMPUTER NETWORK

(75) Inventor: Bruno Rijsman, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/425,591

(22) Filed: Apr. 17, 2009

(65) Prior Publication Data

US 2009/0201934 A1 Aug. 13, 2009

Related U.S. Application Data

(63) Continuation of application No. 11/249,076, filed on Oct. 12, 2005, now Pat. No. 7,532,633.

(51) Int. Cl.
*H04L 12/28* (2006.01)
(52) U.S. Cl. .................. 370/401; 370/392; 370/389
(58) Field of Classification Search .................. None
See application file for complete search history.

(56) References Cited

U.S. PATENT DOCUMENTS

| | | | | |
|---|---|---|---|---|
| 7,068,654 | B1 * | 6/2006 | Joseph et al. | 370/392 |
| 7,072,346 | B2 * | 7/2006 | Hama | 370/395.53 |
| 7,260,097 | B2 | 8/2007 | Casey | |
| 7,394,820 | B1 | 7/2008 | Dianda | |
| 7,532,633 | B2 * | 5/2009 | Rijsman | 370/401 |
| 2006/0018313 | A1 * | 1/2006 | Oki et al. | 370/389 |

OTHER PUBLICATIONS

Notification of the Second Office Action dated Nov. 13, 2009, for corresponding Chinese Application No. 200610140183.2, 10 pgs.
European Search Report Dated Mar. 21, 2007, from corresponding European Application No. 06255255.9-2413, 7 pgs.
L. Andersson et al., "LDP Specification," Internet Engineering Task Force, The Internet Society, Jan. 2001, XP015008819, 133 pgs.
L. Martini et al., "Pseudowire Setup and Maintenance using the Label Distribution Protocol," Internet Engineering Task Force, Jun. 2005, XP015040861, 35 pgs.
F. Palmieri et al., "Securing the MPLS Control Plane," High Performance Computing and Communications International Conference No. 1, 2005, pp. 511-523.
A. Heffernan, "Protection of BGP Sessions via the TCP MD5 Signature Option," Internet Engineering Task Force, XP015008169, Aug. 1998, 7 pgs.
"Carrier requirements of core IP routers 2002," White Paper BTexact Technologies, XP002423497, www.juniper.net/products/features/core/BTexact-Carrier-requirements-of-core-ip-routers.pdf, 13 pgs.
Notification of the First Office Action dated Apr. 10, 2009, for corresponding Chinese Application No. 200610140183.2, 9 pgs.
Third Office Action from Chinese patent application No. 200610140183.2, mailed Apr. 14, 2010, 4 pp.

* cited by examiner

*Primary Examiner* — Duc C Ho
(74) *Attorney, Agent, or Firm* — Shumaker & Sieffert, P.A.

(57) ABSTRACT

A label switching router (LSR) is described that spoof checks Multi-protocol Label Switching (MPLS) packets to prevent malicious or inadvertent injection of MPLS packets within a label switched path (LSP). The LSR ensures that MPLS packets received from an upstream label switching router (LSR) contain labels that were advertised to that upstream LSR. A software module associated with a signaling protocol, such as the Resource Reservation Protocol (RSVP), the Label Distribution Protocol (LDP), or the Border Gateway Protocol (BGP), is extended to utilize an MPLS forwarding table, and MPLS interface table, and a remote autonomous system table. A set of interfaces for which the label was advertised may be checked to determine whether an interface on which a packet was received is contained in the set of interfaces. The MPLS forwarding table may contain a spoof-check field used to specify one of several different types of spoof checks and to specify the set of interfaces.

20 Claims, 6 Drawing Sheets

| IN-LABEL ↙52 | NEXT-HOP ↙54 | SPOOF-CHECK ↙56 |
|---|---|---|
| 300 | 12C | 16A |
| 400 | 12D | 16A, 16E, 16F, 16H |
| 500 | 12F | 16B, 16H |
| ... | ... | ... |
| N | 12D | 16B, 16C, 16D |

| INDEX ↙68 | VIRTUAL ROUTER ↙70 | REMOTE AS INDEX ↙72 |
|---|---|---|
| 0 | 0 | 0 |
| 1 | 0 | 0 |
| 2 | 1 | 0 |
| 3 | 1 | 1 |
| 4 | 1 | 2 |
| ... | ... | ... |
| N | 1 | 2 |

| INDEX ↙60 | REMOTE AS ↙62 |
|---|---|
| 0 | 1000 |
| 1 | 2000 |
| 2 | 3000 |
| 3 | 0 (NOT USED) |
| 4 | 0 (NOT USED) |
| ... | ... |
| N | 0 (NOT USED) |

SPOOF CHECKING WITHIN A LABEL SWITCHING COMPUTER NETWORK

This application is a continuation of U.S. patent application Ser. No. 11/249,076, filed Oct. 12, 2005, the entire content of which is incorporated herein by reference.

TECHNICAL FIELD

Principles of the invention relate to computer networks and, more particularly, to prevention of attacks within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer network increasingly utilize label switching protocols for traffic engineering and other purposes. In a label switching network, label switching routers (LSRs) use Multi-Protocol Label Switching (MPLS) signaling protocols to establish label switched paths (LSPs). The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Conventional LSRs often assume that any given upstream LSR connected can be "trusted" to only send MPLS packets using labels that were actually advertised to the upstream LSR. However, this poses potential security vulnerability in that an LSR may receive an MPLS packet from a source other than an upstream LSR to which a label mapping has been advertised. In other words, a malicious source may "spoof" an upstream LSR by outputting MPLS packets in accordance with the corresponding label mapping for one or more LSPs. If a downstream LSR accepts the spoofed MPLS packets and label-switches the packets and forwards the packets to downstream LSRs, a security breach has occurred. The malicious source has successfully (or possibly inadvertently) injected MPLS packets into an LSP even though that LSP was not upwardly signaled to the source.

Detecting and preventing MPLS spoofing can be a difficult task, and conventional detection schemes for packet-based systems may be inadequate. For example, one conventional approach often applied in a packet-based network is simply to verify the source address of a received packet. However, there is typically no source address associated with a packet in the MPLS context.

Consequently, some LSRs attempt to prevent MPLS spoofing by verifying that a packet is received on an interface that has been enabled for MPLS. If MPLS is not enabled for that particular interface, the LSR drops the packet. However, this approach will not prevent security breaches when the spoofed MPLS traffic is received on MPLS-enabled interfaces, as may readily occur for interfaces between different service providers, or where MPLS is enabled on interfaces between service providers and customers.

SUMMARY

In general, principles of the invention are directed to techniques for maintaining network security and, more specifically, detecting and preventing MPLS spoofing. The techniques allow a software module associated with a signaling protocol to be extended in a manner that allows a label switching router (LSR) to verify that multi-protocol label switching (MPLS) packets are received from a legitimate upstream LSR to which an MPLS label was actually advertised. The techniques may be applied to any signaling protocol, such as the Resource Reservation Setup Protocol with Traffic Engineering (RSVP-TE), the Label Distribution Protocol (LDP), or the Border Gateway Protocol (BGP).

In one embodiment, a method comprises advertising a label for a label switched path (LSP), wherein the label is associated with an interface, receiving a packet having the label, and verifying that the packet was received on the interface.

In another embodiment, a routing device comprises a routing engine and an interface card that advertises a label for an LSP, wherein the label is associated with an interface. The interface card also receives a packet having the label and verifies that the packet was received on the interface.

In another embodiment, a computer-readable medium comprises instructions for causing a programmable processor to advertise a label for an LSP, wherein the label is associated with an interface, receive a packet having the label, and verify that the packet was received on the interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
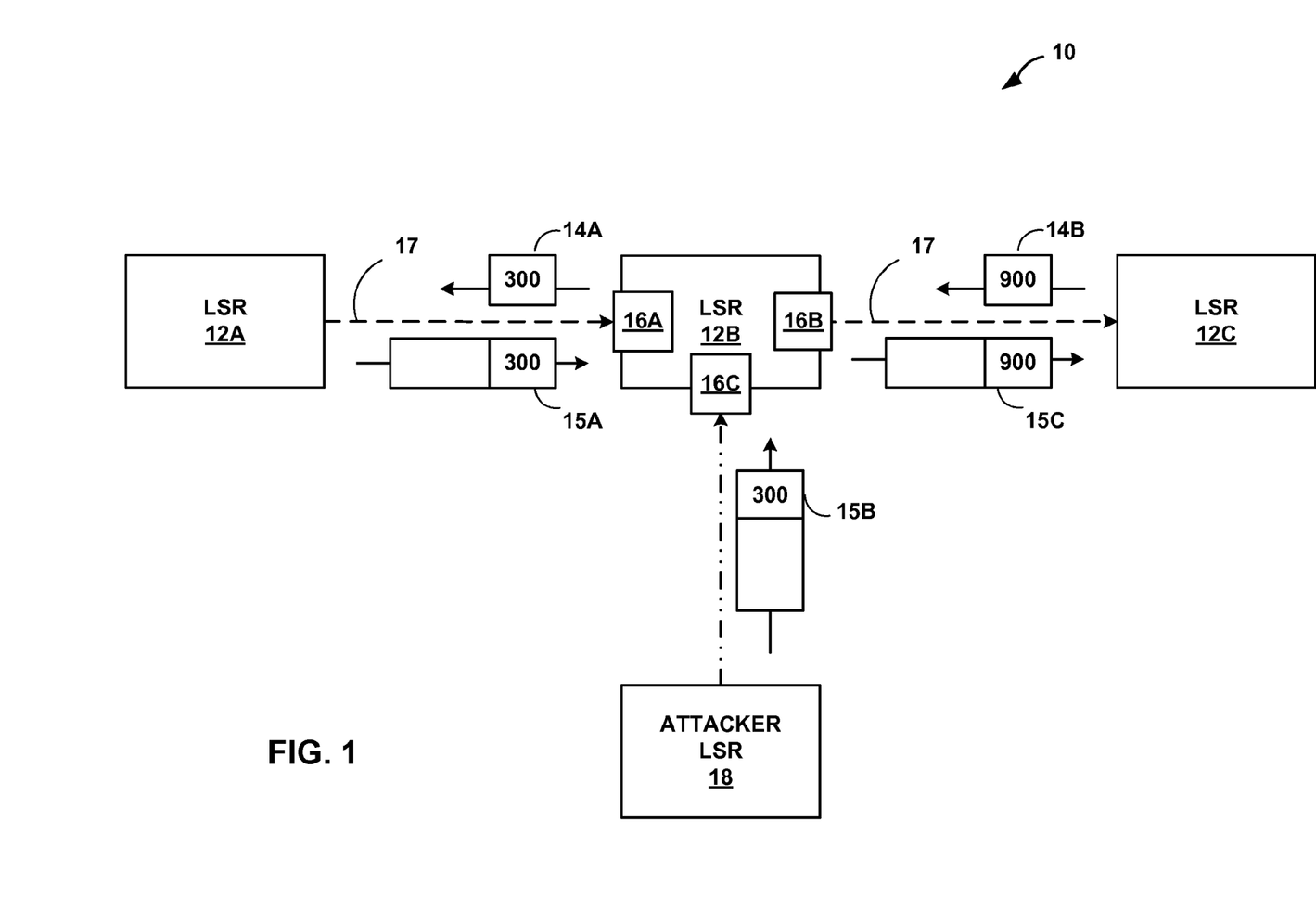
FIG. 1 is a block diagram illustrating an example system in which a label switching router (LSR) spoof-checks incoming Multi-protocol Label Switching (MPLS) packets in accordance with the principles of the invention.

FIG. 1 is a block diagram illustrating an example system 10 in which a label switching router (LSR) 12B spoof-checks incoming Multi-protocol Label Switching (MPLS) packets 15A and 15B in accordance with the principles of the invention. In the example of FIG. 1, LSRs 12A, 12B and 12C communicate via an MPLS protocol to signal a label switched path (LSP) 17. Once established, LSP 17 carries MPLS traffic from LSR 12A acting as a source LSR to LSR 12C acting as a leaf node of LSP 17. In other words, MPLS traffic flows from left to right through LSP 17 of FIG. 1.

During the process of setting up an LSP from LSR 12A to LSR 12C, LSR 12C sends a message 14B advertising a first MPLS label, for example, label "900," to its upstream router LSR 12B. LSR 12B receives the label advertisement on interface 16B and allocates a corresponding second MPLS label, for example, label "300." LSR 12B sends a message 14A on interface 16A advertising the label 300 to LSR 12A.

As described below, one or more of LSRs 12 may utilize a software module associated with a signaling protocol, the software module having been extended to implement the MPLS packet spoof checking techniques described herein. Furthermore, in accordance with the principles of the invention, LSRs 12 may specify a type of spoof check to be performed on a per-LSP basis, thereby providing a fine-grain level of security. For example, for each LSP, LSRs 12 may utilize the software module associated with a signaling protocol to specify whether an interface spoof check, a virtual router spoof check, or a remote autonomous system (AS) spoof check should be performed for a particular LSP.

As one example, assume that LSRs 12 utilize the extended software module to require an interface spoof check for LSP 17. When LSR 12B receives an MPLS packet bearing an MPLS label, LSR 12B looks up the label in an MPLS forwarding table having an additional spoof-check field to determine whether the interface on which the MPLS packet was received is an interface on which an MPLS packet with that label is expected to be received. In this case, when LSR 12B receives an MPLS packet 15A on interface 16A having a label 300, LSR 12B determines whether interface 16A is the particular interface over which label 300 was initially advertised. In the example of FIG. 1, LSR 12B determines that label 300 was advertised over interface 16A. Consequently, LSR 12B accepts the MPLS packet, swaps the label 300 with the first MPLS label 900, and forwards the resulting MPLS packet 15C to LSR 12C.

However, an attacker LSR 18 may attempt to inject MPLS packets into the LSP by sending an MPLS packet 15B having label 300 to LSR 12B on interface 16C, intending that LSR 12B should switch the label to 900 and forward the MPLS packet on to LSR 12C. In this situation, LSR 12B did not advertise label 300 on interface 16C to attacker LSR 18.

Upon receiving MPLS packet 15B on interface 16C, LSR 12B determines that label 300 was not advertised over interface 16C. LSR 12B drops MPLS packet 15B and does not forward it to LSR 12C. In one embodiment, dropped packets may be counted, logged, or collected for further analysis. In this manner, LSR 12B prevents network attacks by spoof-checking inbound MPLS packets before forwarding them to verify that they are received on interfaces over which their label was advertised.

Although described in reference to a point-to-point LSP, the principles of the invention may be readily applied to point-to-multi-point (P2MP) LSP. Moreover, the techniques may be applied to either source-initiated or leaf-initiated LSPs.

Figure 2:
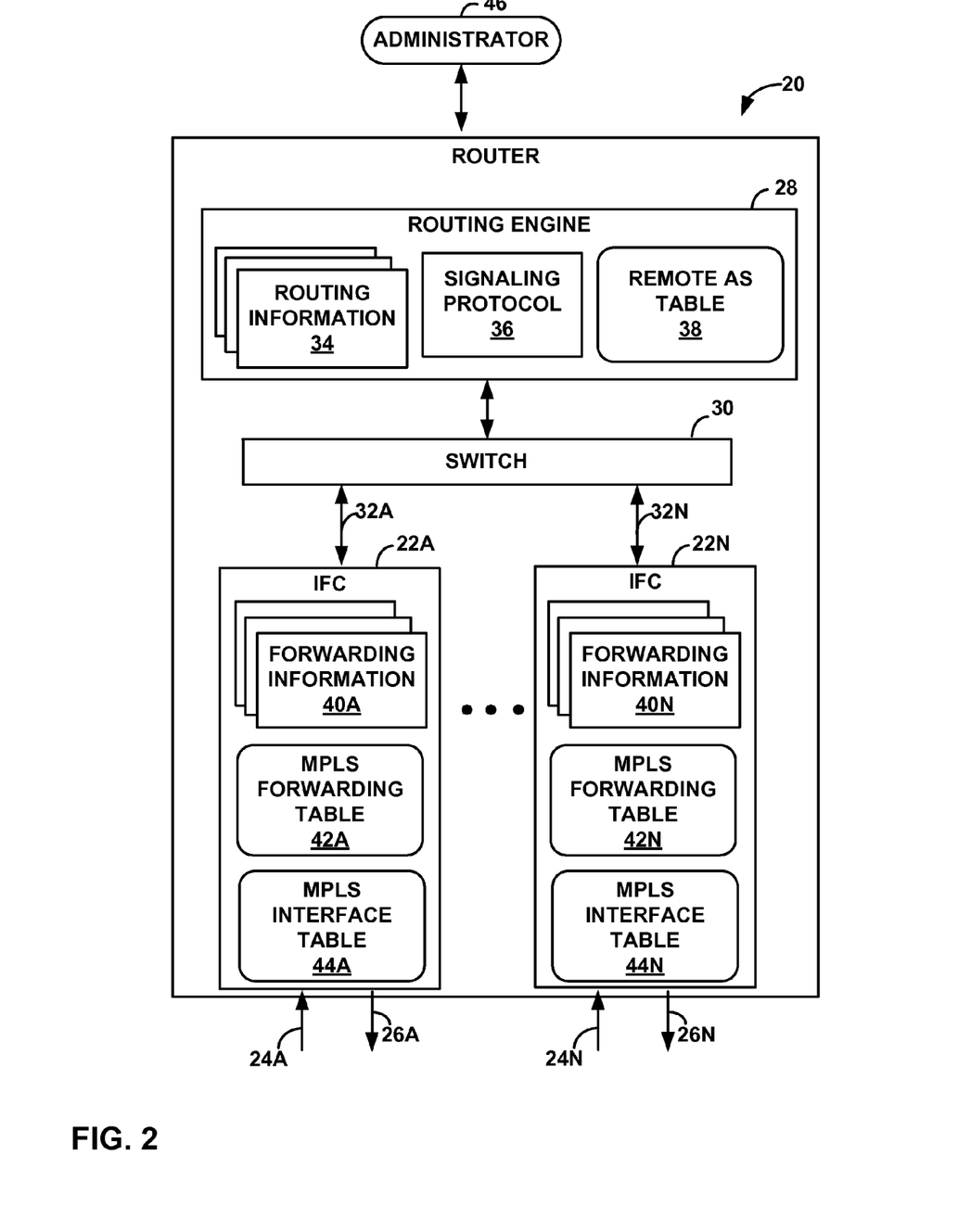
FIG. 2 is a block diagram illustrating an exemplary embodiment of a router that spoof-checks incoming MPLS packets in accordance with the principles of the invention.

FIG. 2 is a block diagram illustrating an exemplary embodiment of a router 20 that spoof checks incoming MPLS packets in accordance with the principles of the invention. In the exemplary embodiment of FIG. 2, router 20 includes interface cards 22A-22N (collectively, IFCs 22) that receive and send packet flows via network links 24A-24N and 26A-26N, respectively. Router 20 may include a chassis (not shown) having a number of slots for receiving a set of cards, including IFCs 22. Each card may be inserted into a corresponding slot of the chassis for electrically coupling the card to routing engine 28 via high-speed switch 30 and internal data paths 32A-32N (collectively, internal data paths 32).

Switch 30 also provides an interconnect path between each of IFCs 22. Switch 30 may comprise, for example, switch fabric, switchgear, a configurable network switch or hub, or other high-speed switching mechanisms. Internal data paths 32 may comprise any form of communication paths, such as electrical paths within an integrated circuit, external data busses, optical links, network connections, wireless connections, or other communication paths. IFCs 22 may be coupled to network links 24A-24N and 26A-26N via a number of physical interface ports (not shown).

In general, routing engine 28 operates as a control unit for router 20, and maintains routing information 34 that reflects a topology of a network. Router 20 may provide customers with virtual private network (VPN) services. In the context of multiple VPNs, routing information 34 may be organized into logically separate routing information data structures. Router 20 may maintain routing information 34 in the form of one or more tables, databases, link lists, radix trees, databases, flat files, or any other data structure. Based on routing information 34, routing engine 28 generates forwarding information 40A-40N (forwarding information 40) for IFCs 22. Forwarding information 40 may similarly be organized into logically separate routing information data structures in the context of multiple VPNs.

Each of the IFCs 22 includes a forwarding component (not shown) that forwards packets in accordance with forwarding information 40 and MPLS forwarding tables 42A-42N (MPLS forwarding tables 42) generated by routing engine 28. Specifically, the forwarding components of IFCs 22 determine a next hop for each inbound packet based on forwarding information 40, identify the corresponding IFCs associated with the next hop, and relay the packets to the appropriate IFCs via switch 30 and data paths 32.

Although not separately illustrated, forwarding information 40 may include "global" forwarding information (e.g., forwarding information associated with the public network) and VPN routing and forwarding tables (VRFs) associated with any VPNs provided by router 20. In providing VPN services, router 20 may maintain logically isolated forwarding tables for each VPN. For example, router 20 may maintain a VRF table for each VPN.

Routing engine 28 provides an operating environment for at least one signaling protocol 36 executing within routing engine 28. Signaling protocol 36 may be, for example, a protocol such as the Resource Reservation Protocol (RSVP), the Label Distribution Protocol (LDP), or the Border Gateway Protocol (BGP). A software module associated with signaling protocol 36 may be extended to implement the MPLS packet spoof checking techniques described herein. For example, the software module associated with signaling protocol 36 may determine a type of spoof check to perform for individual LSPs associated with respective labels, thereby providing a fine-grain level of security.

In one embodiment, for individual LSPs, the software module associated with signaling protocol 36 may specify three different types of MPLS spook checks: (1) an interface spoof check, (2) a virtual router spoof check, or (3) a remote autonomous system (AS) spoof check. To facilitate these three types of MPLS spoof checks, router 20 maintains remote autonomous system table 38 ("remote AS table 38"), MPLS forwarding tables 42A-42N and MPLS interface tables 44A-44N.

In general, remote AS table 38 correlates index numbers with remote autonomous systems associated with router 20 to facilitate efficient use of bits in the spoof check field of MPLS forwarding tables 42.

MPLS forwarding tables 42 and MPLS interface tables 44A-44N (MPLS interface tables 44) are maintained in IFCs 22 for use in spoof checking incoming MPLS packets. MPLS forwarding tables 42 correlate labels associated with incoming MPLS packets with next hops. In accordance with the principles of the invention, MPLS forwarding tables 42 have been extended to include an additional spoof check information field for storing spoof check information for each forwarding entry. MPLS interface tables 44 correlate interface index numbers with virtual routers or VRFs or logical routers or separate routing tables, and remote AS index numbers. These tables are discussed in further detail below.

In one embodiment, routing engine 28 may maintain master copies of MPLS forwarding tables 42 and MPLS interface tables 44, and may distribute copies of these tables to each of IFCs 22. Routing engine 28 may add, remove, or modify entries to MPLS forwarding tables 42 and MPLS interface tables 44, and may distribute updated copies to IFCs 22. In another embodiment, routing engine 28 may parse the information in MPLS forwarding tables 42 and MPLS interface tables 44 and send only that forwarding information needed by each of IFCs 22 based on the interfaces associated with each of IFCs 22.

When router 20 receives an incoming MPLS packet in IFC 22A via link 24A, IFC 22A performs the specified type of MPLS spoof check on the packet using MPLS forwarding table 42A and MPLS interface table 44A. For example, router 20 may determine whether the packet was received on an interface over which the label was originally advertised. If so, router 20 forwards the packet according to the corresponding one of MPLS forwarding tables 42. However, if the packet was received on an interface other than the interface originally used to advertise the label, router 20 may drop the packet. Dropped packets may be counted, logged, or collected for further analysis.

The embodiment of router 20 shown in FIG. 2 is illustrated for exemplary purposes. Alternatively, router 20 may have a centralized control unit having a routing engine and a forwarding engine. In this embodiment, forwarding functionality is not distributed to IFCs 22, but centralized within the forwarding engine. Moreover, the principles of the invention can be realized within a layer three switch or other device. However, for ease of illustration, the principles of the invention are illustrated in the context of router 20.

In general, the processes described above, including spoof-checking of MPLS packets as described, may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functions of the processes may be implemented by executing the instructions of the computer-readable medium with one or more processors, discrete hardware circuitry, firmware, software executing on a programmable processor, or a combination of any of the above.

Figure 3:
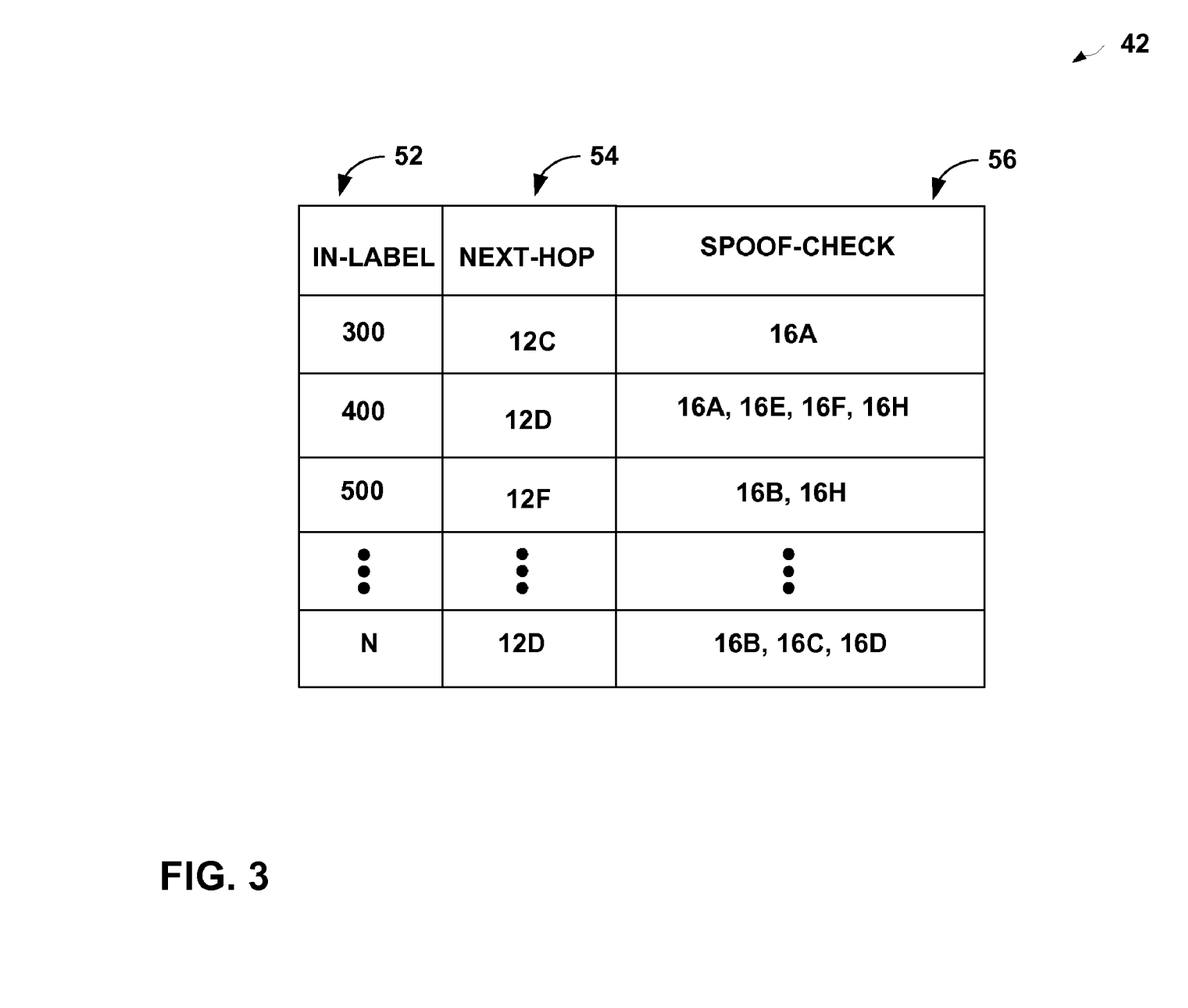
FIG. 3 is a block diagram illustrating an example forwarding table that has been extended to incorporate an additional spoof-check field in accordance with the principles of the invention.

FIG. 3 is a block diagram illustrating an example MPLS forwarding table 42. As illustrated, MPLS forwarding table 42 has been extended to include an additional spoof-check field for each forwarding entry. MPLS forwarding table 42 is used by a router, such as LSR 12B of FIG. 1, in spoof-checking incoming MPLS packets.

In-label field 52 contains a set of labels that virtual routers in an MPLS network may have advertised to upstream LSRs for LSPs. Next-hop field 54 contains a set of destination routers for packets according to their labels. When router 12B receives an MPLS packet, router 12B looks up the packet's label in MPLS forwarding table 42 to determine where to forward the packet. Spoof-check field 56 has been added to MPLS forwarding table 42 for checking whether MPLS packets received from an upstream LSR contain an MPLS label that was originally advertised to that LSR on the interface from which the packet was received.

For example, for each incoming label, spoof-check field 56 contains the set of interfaces on which the label is allowed to arrive, i.e., the set of interfaces over which the label was advertised. When a packet is received bearing label 300, LSR 12B looks up label 300 in MPLS forwarding table 42, and determines that label 300 can be accepted only on interface 16A. If, as described above with respect to FIG. 1, a packet bearing label 300 arrives instead on interface 16C, LSR 12B may drop the packet.

As another example, when a packet is received bearing label 500, LSR 12B looks up label 500 in MPLS forwarding table 42 and determines that label 500 can be accepted on interface 16B or interface 16H. Hardware such as content-addressable memory (CAM) may be used for checking the set of interfaces in spoof-check field 56 for each incoming MPLS packet.

Where the MPLS interface is a multi-access interface (e.g., Ethernet), spoof-check field 56 may also include the layer two (L2) address of the upstream LSR (e.g., the Ethernet Media Access Control (MAC) address) to which the label was advertised.

In this manner, FIG. 3 illustrates an embodiment in which spoof-check field 56 of MPLS forwarding table 42 contains a complete set of allowable interfaces. However, in large systems, the number of interfaces may be substantial and the amount of data contained in spoof-check field 56 may be significant.

Figure 4:
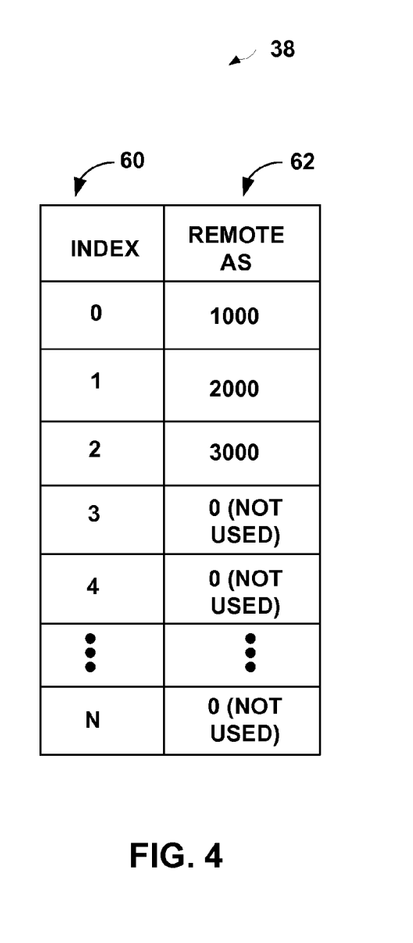
FIG. 4 is a block diagram illustrating an example remote autonomous system table for a virtual router.

FIG. 4 is a block diagram illustrating an example remote AS table 38 for a router, such as router 20 of FIG. 2. Remote AS table 38 associates an index number with each remote AS from which router 20 may receive MPLS packets. For example, index field 60 contains index numbers 0-N. Remote AS field 62 contains numbers, names or other identifiers of remote autonomous systems. In the example of FIG. 4, router 20 receives MPLS packets from only three remote autonomous systems. Thus, indices 3-N are not used. Routing engine 28 may update remote AS table 38 to add additional remote autonomous systems as the network changes. In one embodiment, the index number "0" may be used to indicate the autonomous system in which router 20 resides.

The index numbers associated with the remote autonomous systems ("remote AS index numbers") may be used in MPLS forwarding tables 42 and MPLS interface tables 44 to refer to the remote autonomous systems in a more space efficient manner. For example, in some embodiments, the remote AS index numbers may facilitate efficient use of bits in the spoof check field of MPLS forwarding tables 42.

Figure 5:
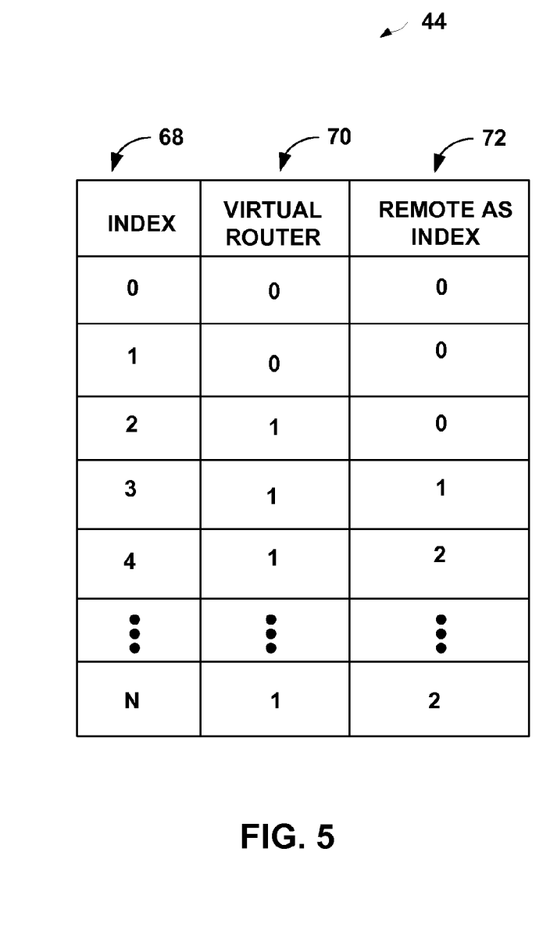
FIG. 5 is a block diagram illustrating an example interface table that associates interfaces with virtual routers and remote autonomous systems.

FIG. 5 is a block diagram illustrating an example MPLS interface table 44 for a router such as router 20 of FIG. 2. MPLS interface table 44 associates interfaces with virtual routers and remote autonomous systems.

Index field 68 contains index numbers 0-N that correlate with interfaces such as interfaces 16 of FIG. 1. Virtual router field 70 contains numbers, names, or other identifiers of virtual routers, and indicates the virtual router of which the corresponding interfaces are a part. For example, according to FIG. 5, interfaces 0 and 1 are a part of virtual router 0, while interfaces 2, 3, 4, and N are a part of virtual router 1.

Remote AS index field 72 contains remote AS index numbers, and indicates the remote AS from which MPLS traffic is expected on the corresponding interface. In the case of an exterior BGP (EBGP) session to another service provider where routes and labels are exchanged over that session, it is possible to associate a particular interface with that EBGP session.

Accordingly, MPLS interface table 44 and remote AS table 38 can be used together to determine the interfaces on which MPLS traffic is expected from a particular remote AS. In the example of FIG. 5, MPLS traffic from remote AS 1000 is expected on interfaces 0, 1, and 2, MPLS traffic from remote AS 2000 is expected on interface 3, and MPLS traffic from remote AS 3000 is expected on interfaces 4 and N. In one embodiment, the remote AS index number "0" in remote AS index field 72 may indicate that the interface leads to router within the same autonomous system as router 20. This may mean that either BGP is not enabled on that interface, or the session is an interior BGP (IBGP) session.

Figure 6:
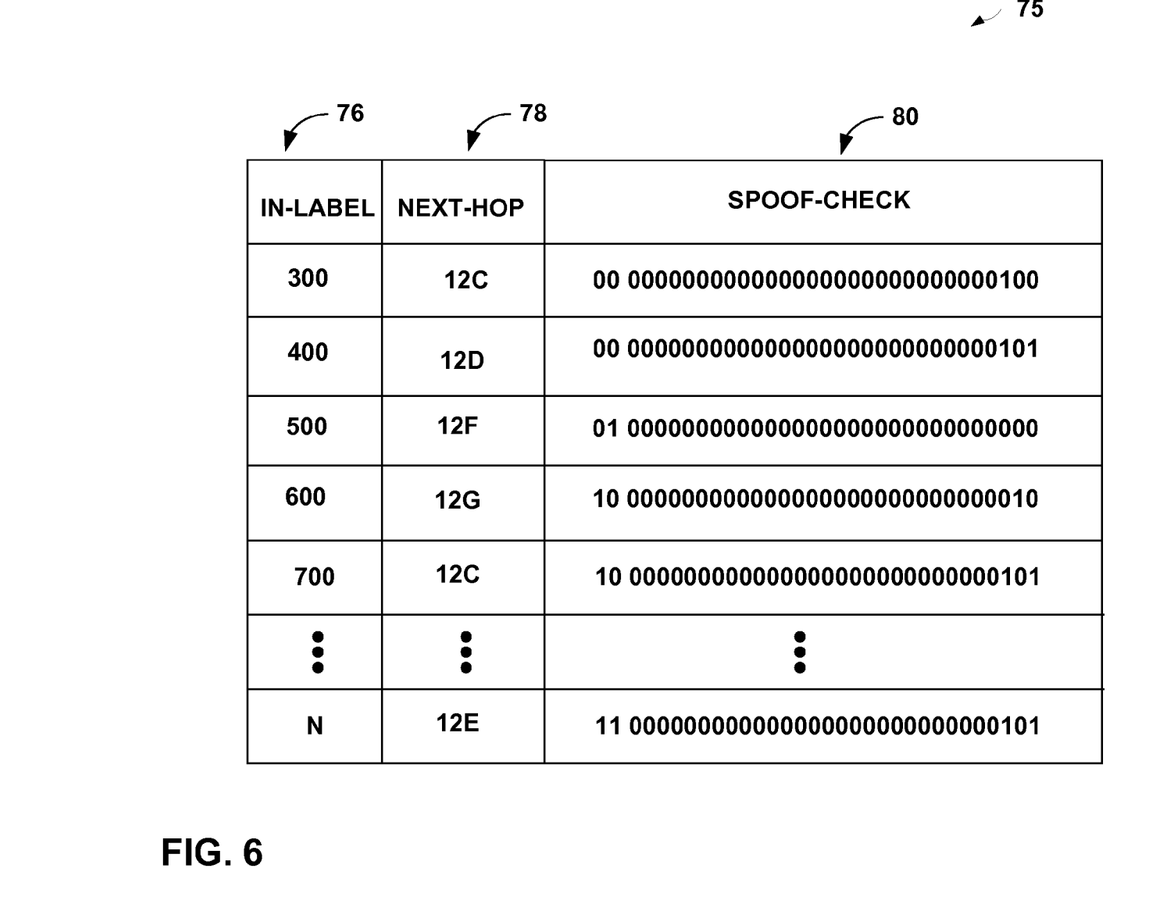
FIG. 6 is a block diagram illustrating another example forwarding table having a spoof-check field.

FIG. 6 is a block diagram illustrating another embodiment of an MPLS forwarding table 75 having an additional spoof-check field. Similar to MPLS forwarding table of FIG. 3, in-label field 76 contains a set of labels that virtual routers in an MPLS network may have advertised to upstream LSRs for LSPs. Next-hop field 78 contains a set of destination routers for packets according to their labels.

MPLS forwarding table 75 of FIG. 6 differs from MPLS forwarding table 42 of FIG. 3 in that in FIG. 6, the spoof check field of MPLS forwarding table 75 does not contain the entire set of interfaces from which router 12B may receive a packet. Rather, spoof check field 80 of MPLS forwarding table is structured for space and time efficiency for the spoof checking process. In the example of FIG. 6, spoof check field 80 has thirty-two bits. In other embodiments, spoof check field 80 may contain other quantities of bits.

As illustrated in FIG. 6, the first two bits of spoof check field 80 indicate the type of spoof check required for the corresponding label. In this embodiment, any of three types of spoof checks may be designated. For example, the spoof check type may be an interface spoof check designed for Resource Reservation Protocol (RSVP), a virtual router spoof check designed for Label Distribution Protocol (LDP), or a remote AS spoof check designed for Border Gateway Protocol (BGP).

In one embodiment, the interface spoof check type is indicated by the first two bits being "00". In the interface spoof check, the remaining thirty bits in the spoof check field identify the interface on which the corresponding label of in-label column 76 must arrive. In this embodiment, where an interface is multi-access (e.g., Ethernet), only the interface is spoof-checked, and not the L2 address (e.g., the MAC address). In the example of FIG. 6, labels 300 and 400 correspond to interface type spoof checks, since the first two bits of the corresponding spoof-check field entries are "00". According to the spoof check information in spoof check column 80, label 300 must arrive on interface 4, and label 400 must arrive on interface 5.

In another embodiment, a second type of interface spoof check may be indicated by the first two bits being "11". In the second type of interface spoof check, the remaining thirty bits in the spoof check field may identify two interfaces on which the corresponding label of in-label column 76 may arrive. This may be used, for example, where there is a first interface over which MPLS traffic will travel, and a second interface onto which MPLS traffic may be fast rerouted. In this embodiment the first fifteen bits may identify the first interface and the remaining fifteen bits may identify the second interface. In the example of FIG. 6, label N corresponds to the second type of interface spoof check, since the first two bits of the corresponding spoof check entry is "11". According to the spoof check information in spoof check column 80, label N may arrive on interface 0 or interface 5.

The virtual router spoof check type may be indicated by the first two bits of spoof check field 80 being "01". In the virtual router spoof check, the remaining thirty bits in the spoof check field identify a virtual router that contains interfaces on which the corresponding label of in-label column 76 may arrive. In the example of FIG. 6, label 500 corresponds to a virtual router type spoof check, since the first two bits of the corresponding spoof-check field entry is "01". According to the spoof check information in spoof check column 80, label 500 must arrive on an interface that is in virtual router 0. Referring back to MPLS interface table 44 of FIG. 5 shows that interfaces 0 and 1 are in virtual router 0. Thus, label 500 may arrive on both interfaces 0 and 1.

The remote AS spoof check type may be indicated by the first two bits of spoof check field 80 being "10". In the remote AS spoof check, the remaining thirty bits in the spoof check field identify the set of remote autonomous systems that contain interfaces on which the corresponding label of in-label column 76 must arrive. In particular, each bit maps to one of the remote AS index numbers of remote AS table 38 of FIG. 4, from right to left. If the bit is set to "1", the corresponding remote AS index number is indicated.

In the example of FIG. 6, labels 600 and 700 correspond to a remote AS spoof check type, since the first two bits of the corresponding spoof-check field entries are "10". According to the spoof check information in spoof check column 80, label 600 must arrive on an interface that is associated with the remote AS having index 1. According to MPLS interface table 44, interface 3 is associated with remote AS index 1. Thus, label 600 must arrive on interface 3.

According to the spoof check information in spoof check column 80, label 700 may arrive on interfaces that are associated with either remote AS index 0 or remote AS index 2. According to MPLS interface table 44, interfaces 0, 1, and 2 are associated with remote AS index number 0, and interfaces 4 and 5 are associated with remote AS index number 2. Thus, label 700 may arrive on interfaces 0, 1, 2, 4, and 5.

Figure 7:
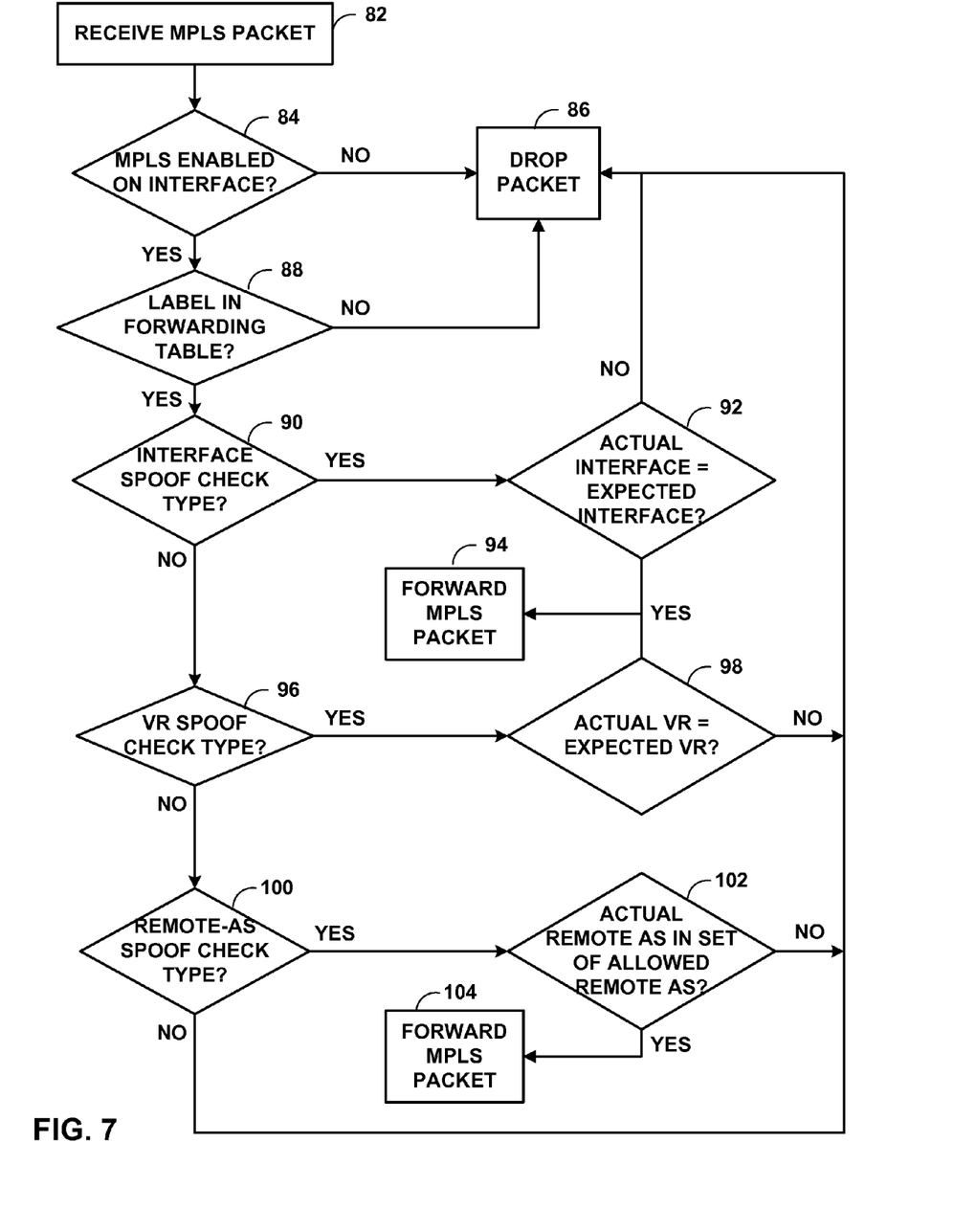
FIG. 7 is a flowchart illustrating example operation of the router of FIG. 2.

FIG. 7 is a flowchart illustrating exemplary operation of a network device performing MPLS spoof checking in accordance with the principles of the invention. The network device may be substantially similar to router 20 illustrated in FIG. 2.

Initially, router 20 receives an MPLS packet with an in-label L on interface I (82). Router 20 looks up interface I in the MPLS interface table (84), shown in FIG. 2. If router 20 does not find interface I in the MPLS interface table, router 20 drops the packet (86), since this indicates that MPLS is not enabled on interface I. In one embodiment, dropped packets may be counted, logged, or collected for further analysis. If router 20 does find interface I in the MPLS interface table, router 20 looks up label L in the MPLS forwarding table (88), shown in FIG. 2. If router 20 does not find label L in the MPLS forwarding table, router 20 drops the packet (86), since this indicates that router 20 did not advertise label L.

Router 20 examines spoof-check field 80 (FIG. 6) in the MPLS forwarding table entry corresponding to label L to determine the type of spoof check required. In the example embodiment of FIG. 6, the first two bits of the spoof check field indicate the type of spoof check. If the spoof-check field indicates that the type of spoof check is an interface spoof check (90), indicated in one embodiment by "00," router 20 extracts the expected MPLS interface I' from the spoof-check field 80. Router 20 compares the actual interface I on which the packet arrived with the expected interface I' (92). If the actual interface I is the same as the expected interface, router 20 forwards the MPLS packet in accordance with the next-hop in the MPLS forwarding table entry for this in-label (94). If the actual interface is not the same as the expected interface, router 20 drops the packet (86), since the packet was received from an LSR to which router 20 had not advertised this label.

In another embodiment, the spoof-check field may indicate a second type of interface spoof check, indicated by "11." The second type of interface spoof check may be used, for example, where there is a first interface over which MPLS traffic will travel, and a second interface onto which MPLS traffic may be fast rerouted. In the second type of interface spoof check, router 20 may extract from the spoof check field two expected interfaces on which the label may arrive. In this case, Router 20 compares the actual interface on which the packet arrived with the two expected interfaces (92). If the actual interface is the same as either of the expected interfaces, router 20 forwards the MPLS packet in accordance with the next-hop in the MPLS forwarding table entry for this in-label (94). If the actual interface is not the same as either of the expected interfaces, router 20 drops the packet (86), since the packet was received from an LSR to which router 20 had not advertised this label.

If the spoof-check field indicates that the type of spoof check is a virtual router spoof check ("VR Spoof Check Type" 96), indicated in one embodiment by "01," router 20 extracts the expected virtual router R' from the spoof-check field. Router 20 compares the actual virtual router V corresponding to the interface on which the label actually arrived to the expected virtual router R' (32). If the actual virtual router V is the same as the expected virtual router R', router 20 forwards the MPLS packet in accordance with the next-hop in the MPLS forwarding table entry for this in-label (94). If the actual virtual router is not the same as the expected virtual router, router 20 drops the packet (86), since the packet was received from an LSR to which router 20 had not advertised this label.

If the spoof-check field indicates that the type of spoof check is a remote AS spoof check (100), indicated in one embodiment by "10," router 20 extracts the set of allowed remote AS indices A' from the spoof-check field. Router 20 compares the actual remote AS index A corresponding to the interface on which the label actually arrived to the set of allowed remote AS indices (102). If the actual remote AS index is in the set of allowed remote AS indices, router 20 forwards the MPLS packet in accordance with the next-hop in the MPLS forwarding table entry for this in-label (104). If the actual remote AS index is not in the set of allowed remote AS indices, router 20 drops the packet (86), since the packet was received from an LSR to which router 20 had not advertised this label.

Various embodiments of the invention have been described. These and other embodiments are within the scope of the following claims.

The invention claimed is:

1. A method comprising:
advertising a label for a label switched path (LSP) over an interface, wherein the label is associated with the interface;
receiving a packet having the label, wherein the packet is a Multiprotocol Label Switching (MPLS) packet; and
determining whether an interface on which the packet was received is the same as the interface from which the label was originally advertised.

2. The method of claim 1, further comprising:
maintaining a set of a plurality of interfaces for which the label was advertised; and
determining whether the interface on which the packet was received is contained in the set of interfaces.

3. The method of claim 2, wherein the interface is a multi-access interface, further comprising:
maintaining a set of layer two (L2) addresses of label switching routers (LSRs) to which a label was advertised; and
determining whether the L2 address of the LSR from which the packet was received is contained in the set of L2 addresses.

4. The method of claim 1, further comprising:
maintaining a remote autonomous system table that associates index numbers with remote autonomous systems;
maintaining a forwarding table that associates labels with a type of spoof check and spoof check information; and
maintaining an interface table that associate interface index numbers with virtual routers and remote autonomous system index numbers,
wherein verifying that the packet was received on the interface from which the label was originally advertised comprises verifying based on examining one or more of the remote autonomous system table, the forwarding table, and the interface table.

5. The method of claim 4, further comprising:
comparing the interface on which the packet was received with an expected interface, wherein the expected interface is specified by the spoof check information;
dropping the packet when the interface is not the same as the expected interface; and
forwarding the packet when the interface is the same as the expected interface.

6. The method of claim 4, further comprising:
comparing a virtual router associated with the interface on which the packet was received with an expected virtual router, wherein the expected virtual router is specified by the spoof check information;
dropping the packet when the virtual router is not the same as the expected virtual router; and
forwarding the packet when the virtual router is the same as the expected virtual router.

7. The method of claim 4, further comprising:
comparing a remote autonomous system index associated with the interface on which the packet was received with a set of expected remote autonomous system indices, wherein the set of expected remote autonomous system indices is specified by the spoof check information;
dropping the packet when the remote autonomous system index is not in the set of expected remote autonomous system indices; and
forwarding the packet when the remote autonomous system index is in the set of expected remote autonomous system indices.

8. A method comprising:
advertising a label for a label switched path (LSP) over an interface, wherein the label is associated with the interface;
receiving a packet having the label;
determining a type of spoof check based on the LSP for which the label is advertised; and determining whether an interface on which the packet was received is the same as the interface from which the label was originally advertised using the determined type of spoof check.

9. A routing device comprising:
a routing engine; and
an interface card that advertises a label for a label switched path (LSP) over an interface,
wherein upon receiving a packet with the label, wherein the packet is a Multiprotocol Label Switching (MPLS) packet, the interface card determines whether an interface on which the packet was received is the same as the interface originally used to advertise the label.

10. The routing device of claim 9, further comprising a forwarding table that maintains a set of interfaces for which the label was advertised, and wherein the interface card determines whether the interface on which the packet was received is contained in the set of interfaces.

11. The routing device of claim 9, further comprising
a remote autonomous system table that associates index numbers with remote autonomous systems;
a forwarding table that associates labels with a type of spoof check and spoof check information; and
an interface table that associate interface index numbers with virtual routers and remote autonomous system index numbers,
wherein the interface card determines whether the interface on which the packet was received is the same as the interface originally used to advertise the label based on examination of one or more of the remote autonomous system table, the forwarding table, and the interface table.

12. The routing device of claim 11, wherein the interface card drops the packet when the interface on which the packet was received is not the same as an expected interface.

13. The routing device of claim 11, wherein the interface card drops the packet when a virtual router associated with the interface on which the packet was received is not the same as an expected virtual router.

14. The routing device of claim 11, wherein the interface card drops the packet when a remote autonomous system index associated with the interface on which the packet was received is not in a set of expected remote autonomous system indices specified by the spoof check information.

15. The routing device of claim 11, wherein the forwarding table and the interface table reside in the interface card, and wherein the remote autonomous system table resides in the routing engine.

16. A routing device comprising:
a routing engine;
an interface card that advertises a label for a label switched path (LSP) over an interface,
wherein upon receiving a packet with the label, the interface card determines whether an interface on which the packet was received is the same as the interface originally used to advertise the label; and
a software module, associated with a signaling protocol, that is extended to maintain spoof check information for use in the determination.

17. The routing device of claim 16, wherein the signaling protocol comprises one of the Resource Reservation Protocol (RSVP), the Label Distribution Protocol (LDP), and the Border Gateway Protocol (BGP).

18. A non-transitory computer-readable medium comprising instructions for causing a network device to:
advertise a label for a label switched path (LSP) over an interface, wherein the label is associated with the interface;
receive a packet having the label, wherein the packet is a Multiprotocol Label Switching (MPLS) packet; and
determine whether an interface on which the packet was received is the same as the interface from which the label was originally advertised.

19. The non-transitory computer-readable medium of claim 18, wherein the instructions cause the network device to:
maintain a set of layer two (L2) addresses of label switching routers (LSRs) to which a label was advertised; and
determine whether the L2 address of the LSR from which the packet was received is contained in the set of L2 addresses.

20. A method comprising:
maintaining a remote autonomous system table that associates index numbers with remote autonomous systems;
maintaining a forwarding table that associates labels with a type of spoof check and spoof check information;
maintaining an interface table that associate interface index numbers with virtual routers and remote autonomous system index numbers;
advertising a label for a label switched path (LSP over an interface, wherein the label is associated with the interface;
receiving a packet having the label; and
determining whether an interface on which the packet was received is the same as the interface from which the label was originally advertised based on examination of one or more of the remote autonomous system table, the forwarding table, and the interface table.

* * * * *